(12) United States Patent
Zhang et al.

(10) Patent No.: US 11,914,076 B2
(45) Date of Patent: *Feb. 27, 2024

(54) SOLID STATE PULSE STEERING IN LIDAR SYSTEMS

(71) Applicant: Innovusion, Inc., Sunnyvale, CA (US)

(72) Inventors: Rui Zhang, Palo Alto, CA (US); Yimin Li, Cupertino, CA (US); Junwei Bao, Los Altos, CA (US)

(73) Assignee: INNOVUSION, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/081,571

(22) Filed: Dec. 14, 2022

(65) Prior Publication Data
US 2023/0113450 A1 Apr. 13, 2023

Related U.S. Application Data

(63) Continuation of application No. 16/546,741, filed on Aug. 21, 2019, now Pat. No. 11,579,258.
(Continued)

(51) Int. Cl.
G01S 17/89 (2020.01)
G01S 7/481 (2006.01)
(Continued)

(52) U.S. Cl.
CPC .......... G01S 7/4817 (2013.01); G01S 7/4865 (2013.01); G01S 7/4912 (2013.01); G01S 17/89 (2013.01); G02B 27/0922 (2013.01)

(58) Field of Classification Search
CPC .... G01S 7/4817; G01S 7/4865; G01S 7/4912; G01S 17/89; G02B 27/0922
(Continued)

(56) References Cited

U.S. PATENT DOCUMENTS 3,897,150 A 7/1975 Bridges et al.
4,464,048 A 8/1984 Farlow
(Continued)

FOREIGN PATENT DOCUMENTS

CN 1677050 A 10/2005
CN 204758260 U 11/2015
(Continued)

OTHER PUBLICATIONS

Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.
(Continued)

Primary Examiner — Nguyen T Truong
(74) Attorney, Agent, or Firm — MASCHOFF BRENNAN; Ran Pang; Liang Huang

(57) ABSTRACT

LiDAR system and methods discussed herein use a dispersion element or optic that has a refraction gradient that causes a light pulse to be redirected to a particular angle based on its wavelength. The dispersion element can be used to control a scanning path for light pulses being projected as part of the LiDAR's field of view. The dispersion element enables redirection of light pulses without requiring the physical movement of a medium such as mirror or other reflective surface, and in effect further enables at least portion of the LiDAR's field of view to be managed through solid state control. The solid state control can be performed by selectively adjusting the wavelength of the light pulses to control their projection along the scanning path.

18 Claims, 11 Drawing Sheets

Related U.S. Application Data

(60) Provisional application No. 62/724,689, filed on Aug. 30, 2018.

(51) Int. Cl.
 *G01S 7/4865* (2020.01)
 *G02B 27/09* (2006.01)
 *G01S 7/4912* (2020.01)

(58) Field of Classification Search
 USPC ..................................................... 356/5.01
 See application file for complete search history.

(56) References Cited

U.S. PATENT DOCUMENTS

| | | |
|---|---|---|
| 5,006,721 A | 4/1991 | Cameron et al. |
| 5,157,451 A | 10/1992 | Taboada |
| 5,283,845 A | 2/1994 | Ip |
| 5,319,434 A | 6/1994 | Croteau et al. |
| 5,369,661 A | 11/1994 | Yamaguchi et al. |
| 5,442,358 A | 8/1995 | Keeler et al. |
| 5,546,188 A | 8/1996 | Wangler et al. |
| 5,579,153 A | 11/1996 | Laming et al. |
| 5,657,077 A | 8/1997 | Deangelis et al. |
| 5,793,491 A | 8/1998 | Wangler et al. |
| 5,838,239 A | 11/1998 | Stern et al. |
| 5,864,391 A | 1/1999 | Hosokawa et al. |
| 5,926,259 A | 7/1999 | Bamberger et al. |
| 5,936,756 A | 8/1999 | Nakajima |
| 6,163,378 A | 12/2000 | Khoury |
| 6,317,202 B1 | 11/2001 | Hosokawa et al. |
| 6,594,000 B2 | 7/2003 | Green et al. |
| 6,650,404 B1 | 11/2003 | Crawford |
| 6,950,733 B2 | 9/2005 | Stopczynski |
| 7,128,267 B2 | 10/2006 | Reichenbach et al. |
| 7,202,941 B2 | 4/2007 | Munro |
| 7,345,271 B2 | 3/2008 | Boehlau et al. |
| 7,440,084 B2 | 10/2008 | Kane |
| 7,440,175 B2 | 10/2008 | Di Teodoro et al. |
| 7,489,865 B2 | 2/2009 | Varshneya et al. |
| 7,576,837 B2 | 8/2009 | Liu et al. |
| 7,830,527 B2 | 11/2010 | Chen et al. |
| 7,835,068 B1 | 11/2010 | Brooks et al. |
| 7,847,235 B2 | 12/2010 | Krupkin et al. |
| 7,880,865 B2 | 2/2011 | Tanaka et al. |
| 7,936,448 B2 | 5/2011 | Albuquerque et al. |
| 7,969,558 B2 | 6/2011 | Hall |
| 7,982,861 B2 | 7/2011 | Abshire et al. |
| 8,072,582 B2 | 12/2011 | Meneely |
| 8,471,895 B2 | 6/2013 | Banks |
| 8,736,818 B2 | 5/2014 | Weimer et al. |
| 8,749,764 B2 | 6/2014 | Hsu |
| 8,812,149 B2 | 8/2014 | Doak |
| 8,994,928 B2 | 3/2015 | Shiraishi |
| 9,048,616 B1 | 6/2015 | Robinson |
| 9,065,243 B2 | 6/2015 | Asobe et al. |
| 9,086,273 B1 | 7/2015 | Gruver et al. |
| 9,194,701 B2 | 11/2015 | Bosch |
| 9,255,790 B2 | 2/2016 | Zhu |
| 9,300,321 B2 | 3/2016 | Zalik et al. |
| 9,304,316 B2 | 4/2016 | Weiss et al. |
| 9,316,724 B2 | 4/2016 | Gehring et al. |
| 9,354,485 B2 | 5/2016 | Fermann et al. |
| 9,510,505 B2 | 12/2016 | Halloran et al. |
| 9,575,184 B2 | 2/2017 | Gilliland et al. |
| 9,605,998 B2 | 3/2017 | Nozawa |
| 9,621,876 B2 | 4/2017 | Federspiel |
| 9,638,799 B2 | 5/2017 | Goodwin et al. |
| 9,696,426 B2 | 7/2017 | Zuk |
| 9,702,966 B2 | 7/2017 | Batcheller et al. |
| 9,804,264 B2 | 10/2017 | Villeneuve et al. |
| 9,810,786 B1 | 11/2017 | Welford et al. |
| 9,812,838 B2 | 11/2017 | Villeneuve et al. |
| 9,823,353 B2 | 11/2017 | Eichenholz et al. |
| 9,857,468 B1 | 1/2018 | Eichenholz et al. |
| 9,869,754 B1 | 1/2018 | Campbell et al. |
| 9,880,278 B2 | 1/2018 | Uffelen et al. |
| 9,880,283 B2 | 1/2018 | Droz et al. |
| 9,885,778 B2 | 2/2018 | Dussan |
| 9,897,689 B2 | 2/2018 | Dussan |
| 9,915,726 B2 | 3/2018 | Bailey et al. |
| 9,927,915 B2 | 3/2018 | Frame et al. |
| 9,958,545 B2 | 5/2018 | Eichenholz et al. |
| 10,007,001 B1 | 6/2018 | LaChapelle et al. |
| 10,012,732 B2 | 7/2018 | Eichenholz et al. |
| 10,042,159 B2 | 8/2018 | Dussan et al. |
| 10,061,019 B1 | 8/2018 | Campbell et al. |
| 10,073,166 B2 | 9/2018 | Dussan |
| 10,078,133 B2 | 9/2018 | Dussan |
| 10,084,925 B2 | 10/2018 | LaChapelle |
| 10,157,630 B2 | 12/2018 | Vaughn et al. |
| 10,191,155 B2 | 1/2019 | Curatu |
| 10,215,847 B2 | 2/2019 | Scheim et al. |
| 10,267,898 B2 | 4/2019 | Campbell et al. |
| 10,295,656 B1 | 5/2019 | Li et al. |
| 10,310,058 B1 | 6/2019 | Campbell et al. |
| 10,324,170 B1 | 6/2019 | Enberg, Jr. et al. |
| 10,324,185 B2 | 6/2019 | McWhirter et al. |
| 10,393,877 B2 | 8/2019 | Hall et al. |
| 10,429,495 B1 | 10/2019 | Wang et al. |
| 10,444,356 B2 | 10/2019 | Wu et al. |
| 10,451,716 B2 | 10/2019 | Hughes et al. |
| 10,466,342 B1 | 11/2019 | Zhu et al. |
| 10,502,831 B2 | 12/2019 | Eichenholz |
| 10,509,112 B1 | 12/2019 | Pan |
| 10,520,602 B2 | 12/2019 | Villeneuve et al. |
| 10,557,923 B2 | 2/2020 | Watnik et al. |
| 10,571,567 B2 | 2/2020 | Campbell et al. |
| 10,578,720 B2 | 3/2020 | Hughes et al. |
| 10,591,600 B2 | 3/2020 | Villeneuve et al. |
| 10,627,491 B2 | 4/2020 | Hall et al. |
| 10,641,872 B2 | 5/2020 | Dussan et al. |
| 10,663,564 B2 | 5/2020 | LaChapelle |
| 10,663,585 B2 | 5/2020 | McWhirter |
| 10,663,596 B2 | 5/2020 | Dussan et al. |
| 10,684,360 B2 | 6/2020 | Campbell |
| 10,908,262 B2 | 2/2021 | Dussan |
| 10,908,265 B2 | 2/2021 | Dussan |
| 10,908,268 B2 | 2/2021 | Zhou et al. |
| 10,969,475 B2 | 4/2021 | Li et al. |
| 10,983,218 B2 | 4/2021 | Hall et al. |
| 11,002,835 B2 | 5/2021 | Pan et al. |
| 11,009,605 B2 | 5/2021 | Li et al. |
| 11,194,048 B1 | 12/2021 | Burbank et al. |
| 2002/0063160 A1 | 5/2002 | Krichever et al. |
| 2002/0136251 A1 | 9/2002 | Green et al. |
| 2003/0034398 A1 | 2/2003 | Krichever et al. |
| 2004/0135992 A1 | 7/2004 | Munro |
| 2005/0033497 A1 | 2/2005 | Stopczynski |
| 2005/0190424 A1 | 9/2005 | Reichenbach et al. |
| 2005/0195383 A1 | 9/2005 | Breed et al. |
| 2006/0071846 A1 | 4/2006 | Yanagisawa et al. |
| 2006/0132752 A1 | 6/2006 | Kane |
| 2007/0091948 A1 | 4/2007 | Di Teodoro et al. |
| 2007/0216995 A1 | 9/2007 | Bollond et al. |
| 2008/0174762 A1 | 7/2008 | Liu et al. |
| 2008/0193135 A1 | 8/2008 | Du et al. |
| 2009/0010644 A1 | 1/2009 | Varshneya et al. |
| 2009/0051926 A1 | 2/2009 | Chen |
| 2009/0059201 A1 | 3/2009 | Willner et al. |
| 2009/0067453 A1 | 3/2009 | Mizuuchi et al. |
| 2009/0147239 A1 | 6/2009 | Zhu |
| 2009/0262760 A1 | 10/2009 | Krupkin et al. |
| 2009/0316134 A1 | 12/2009 | Michael et al. |
| 2010/0006760 A1 | 1/2010 | Lee et al. |
| 2010/0020306 A1 | 1/2010 | Hall |
| 2010/0020377 A1 | 1/2010 | Borchers et al. |
| 2010/0027602 A1 | 2/2010 | Abshire et al. |
| 2010/0045965 A1 | 2/2010 | Meneely |
| 2010/0053715 A1 | 3/2010 | O'Neill et al. |
| 2010/0128109 A1 | 5/2010 | Banks |
| 2010/0271614 A1 | 10/2010 | Albuquerque et al. |
| 2011/0181864 A1 | 7/2011 | Schmitt et al. |
| 2012/0038903 A1 | 2/2012 | Weimer et al. |

(56) References Cited

U.S. PATENT DOCUMENTS

| | | |
|---|---|---|
| 2012/0124113 A1 | 5/2012 | Zalik et al. |
| 2012/0221142 A1 | 8/2012 | Doak |
| 2013/0107016 A1 | 5/2013 | Federspeil |
| 2013/0116971 A1 | 5/2013 | Retkowski et al. |
| 2013/0241761 A1 | 9/2013 | Cooper et al. |
| 2013/0293867 A1 | 11/2013 | Hsu et al. |
| 2013/0293946 A1 | 11/2013 | Fermann et al. |
| 2013/0329279 A1 | 12/2013 | Nati et al. |
| 2013/0342822 A1 | 12/2013 | Shiraishi |
| 2014/0078514 A1 | 3/2014 | Zhu |
| 2014/0104594 A1 | 4/2014 | Gammenthaler |
| 2014/0347650 A1 | 11/2014 | Bosch |
| 2014/0350836 A1 | 11/2014 | Stettner et al. |
| 2015/0078123 A1 | 3/2015 | Batcheller et al. |
| 2015/0084805 A1 | 3/2015 | Dawber |
| 2015/0109603 A1 | 4/2015 | Kim et al. |
| 2015/0116692 A1 | 4/2015 | Zuk et al. |
| 2015/0139259 A1 | 5/2015 | Robinson |
| 2015/0158489 A1 | 6/2015 | Oh et al. |
| 2015/0338270 A1 | 11/2015 | Williams et al. |
| 2015/0355327 A1 | 12/2015 | Goodwin et al. |
| 2016/0003946 A1 | 1/2016 | Gilliland et al. |
| 2016/0047896 A1 | 2/2016 | Dussan |
| 2016/0047900 A1 | 2/2016 | Dussan |
| 2016/0061655 A1 | 3/2016 | Nozawa |
| 2016/0061935 A1 | 3/2016 | Mccloskey et al. |
| 2016/0100521 A1 | 4/2016 | Halloran et al. |
| 2016/0117048 A1 | 4/2016 | Frame et al. |
| 2016/0172819 A1 | 6/2016 | Ogaki |
| 2016/0178736 A1 | 6/2016 | Chung |
| 2016/0226210 A1 | 8/2016 | Zayhowski et al. |
| 2016/0245902 A1 | 8/2016 | Natnik |
| 2016/0291134 A1 | 10/2016 | Droz et al. |
| 2016/0313445 A1 | 10/2016 | Bailey et al. |
| 2016/0327646 A1 | 11/2016 | Scheim et al. |
| 2017/0003116 A1 | 1/2017 | Yee et al. |
| 2017/0153319 A1 | 6/2017 | Villeneuve et al. |
| 2017/0242104 A1 | 8/2017 | Dussan |
| 2017/0299721 A1 | 10/2017 | Eichenholz et al. |
| 2017/0307738 A1 | 10/2017 | Schwarz et al. |
| 2017/0365105 A1 | 12/2017 | Rao et al. |
| 2018/0040171 A1 | 2/2018 | Kundu et al. |
| 2018/0050704 A1 | 2/2018 | Tascione et al. |
| 2018/0069367 A1 | 3/2018 | Villeneuve et al. |
| 2018/0152691 A1 | 5/2018 | Pacala et al. |
| 2018/0158471 A1 | 6/2018 | Vaughn et al. |
| 2018/0164439 A1 | 6/2018 | Droz et al. |
| 2018/0156896 A1 | 7/2018 | O'Keeffe |
| 2018/0188355 A1 | 7/2018 | Bao et al. |
| 2018/0188357 A1 | 7/2018 | Li et al. |
| 2018/0188358 A1 | 7/2018 | Li et al. |
| 2018/0188371 A1 | 7/2018 | Bao et al. |
| 2018/0210084 A1 | 7/2018 | Zwölfer et al. |
| 2018/0275274 A1 | 9/2018 | Bao et al. |
| 2018/0284241 A1 | 10/2018 | Campbell et al. |
| 2018/0284242 A1 | 10/2018 | Campbell |
| 2018/0284286 A1 | 10/2018 | Eichenholz et al. |
| 2018/0329060 A1 | 11/2018 | Pacala et al. |
| 2018/0359460 A1 | 12/2018 | Pacala et al. |
| 2019/0025428 A1 | 1/2019 | Li et al. |
| 2019/0107607 A1 | 4/2019 | Danziger |
| 2019/0107623 A1 | 4/2019 | Campbell et al. |
| 2019/0120942 A1 | 4/2019 | Zhang et al. |
| 2019/0120962 A1 | 4/2019 | Gimpel et al. |
| 2019/0154804 A1 | 5/2019 | Eichenholz |
| 2019/0154807 A1 | 5/2019 | Steinkogler et al. |
| 2019/0212416 A1 | 7/2019 | Li et al. |
| 2019/0250254 A1 | 8/2019 | Campbell et al. |
| 2019/0257924 A1 | 8/2019 | Li et al. |
| 2019/0265334 A1 | 8/2019 | Zhang et al. |
| 2019/0265336 A1 | 8/2019 | Zhang et al. |
| 2019/0265337 A1 | 8/2019 | Zhang et al. |
| 2019/0265339 A1 | 8/2019 | Zhang et al. |
| 2019/0277952 A1 | 9/2019 | Beuschel et al. |
| 2019/0310368 A1 | 10/2019 | LaChapelle |
| 2019/0369215 A1 | 12/2019 | Wang et al. |
| 2019/0369258 A1 | 12/2019 | Hall et al. |
| 2019/0383915 A1 | 12/2019 | Li et al. |
| 2020/0142070 A1 | 5/2020 | Hall et al. |
| 2020/0256964 A1 | 8/2020 | Campbell et al. |
| 2020/0284906 A1 | 9/2020 | Eichenholz et al. |
| 2020/0319310 A1 | 10/2020 | Hall et al. |
| 2020/0400798 A1 | 12/2020 | Rezk et al. |
| 2021/0088630 A9 | 3/2021 | Zhang |

FOREIGN PATENT DOCUMENTS

| | | |
|---|---|---|
| CN | 204885804 U | 12/2015 |
| CN | 108132472 A | 6/2018 |
| CN | 207457508 U | 6/2018 |
| CN | 207557465 U | 6/2018 |
| CN | 208314210 U | 1/2019 |
| CN | 208421228 U | 1/2019 |
| CN | 208705506 U | 4/2019 |
| CN | 106597471 B | 5/2019 |
| CN | 209280923 U | 8/2019 |
| CN | 108445468 B | 11/2019 |
| CN | 110031823 B | 3/2020 |
| CN | 108089201 B | 4/2020 |
| CN | 109116331 B | 4/2020 |
| CN | 109917408 B | 4/2020 |
| CN | 109116366 B | 5/2020 |
| CN | 109116367 B | 5/2020 |
| CN | 110031822 B | 5/2020 |
| CN | 211655309 U | 10/2020 |
| CN | 109188397 B | 11/2020 |
| CN | 109814086 B | 11/2020 |
| CN | 109917348 B | 11/2020 |
| CN | 110492856 B | 11/2020 |
| CN | 110736975 B | 11/2020 |
| CN | 109725320 B | 12/2020 |
| CN | 110780284 B | 12/2020 |
| CN | 110780283 B | 1/2021 |
| CN | 110784220 B | 2/2021 |
| CN | 212623082 U | 2/2021 |
| CN | 110492349 B | 3/2021 |
| CN | 109950784 B | 5/2021 |
| CN | 213182011 U | 5/2021 |
| CN | 213750313 U | 7/2021 |
| CN | 214151038 U | 9/2021 |
| CN | 109814082 B | 10/2021 |
| CN | 113491043 A | 10/2021 |
| CN | 214795200 U | 11/2021 |
| CN | 214795206 U | 11/2021 |
| CN | 214895784 U | 11/2021 |
| CN | 214895810 U | 11/2021 |
| CN | 215641806 U | 1/2022 |
| CN | 112639527 B | 2/2022 |
| CN | 215932142 U | 3/2022 |
| CN | 112578396 B | 4/2022 |
| EP | 0 757 257 B1 | 2/1997 |
| EP | 1 237 305 A2 | 9/2002 |
| EP | 1 923 721 A1 | 5/2008 |
| EP | 2 157 445 A2 | 2/2010 |
| EP | 2 395 368 A1 | 12/2011 |
| EP | 2 889 642 A1 | 7/2015 |
| GB | 1 427 164 A | 3/1976 |
| GB | 2000411 | 1/1979 |
| JP | 2007144667 A | 6/2007 |
| JP | 2010035385 A | 2/2010 |
| JP | 2017-003347 A | 1/2017 |
| JP | 2017-138301 A | 8/2017 |
| KR | 10-2012-0013515 A | 2/2012 |
| KR | 10-2013-0068224 A | 6/2013 |
| KR | 10-2018-0107673 A | 10/2018 |
| WO | 2017/110417 A1 | 6/2017 |
| WO | 2018/125725 A1 | 7/2018 |
| WO | 2018/129410 A1 | 7/2018 |
| WO | 2018129408 A1 | 7/2018 |
| WO | 2018129409 A1 | 7/2018 |
| WO | 2018129410 A1 | 7/2018 |
| WO | 2018175990 | 9/2018 |
| WO | 2018182812 A2 | 10/2018 |
| WO | 2019079642 | 4/2019 |

(56) References Cited

FOREIGN PATENT DOCUMENTS

| WO | 2019165095 | | 8/2019 |
|---|---|---|---|
| WO | 2019165289 | A1 | 8/2019 |
| WO | 2019165294 | | 8/2019 |
| WO | 2020013890 | A2 | 1/2020 |

OTHER PUBLICATIONS

Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.

International Preliminary Report on Patentability, dated Jul. 9, 2019, for International Application No. PCT/US2018/012703, 10 pages.

International Preliminary Report on Patentability, dated Jul. 9, 2019, for International Application No. PCT/US2018/012704, 7 pages.

International Preliminary Report on Patentability, dated Jul. 9, 2019, for International Application No. PCT/US2018/012705, 7 pages.

International Search Report and Written Opinion, dated Jan. 17, 2020, for International Application No. PCT/US2019/019276, 14 pages.

International Search Report and Written Opinion, dated Jul. 9, 2019, for International Application No. PCT/US2019/018987, 17 pages.

International Search Report and Written Opinion, dated Sep. 18, 2018, for International Application No. PCT/US2018/012116, 12 pages.

International Search Report and Written Opinion, dated May 3, 2019, for International Application No. PCT/US2019/019272, 16 pages.

International Search Report and Written Opinion, dated May 6, 2019, for International Application No. PCT/US2019/019264, 15 pages.

International Search Report and Written Opinion, dated Jan. 3, 2019, for International Application No. PCT/US2018/056577, 15 pages.

International Search Report and Written Opinion, dated Mar. 23, 2018, for International Application No. PCT/US2018/012704, 12 pages.

International Search Report and Written Opinion, dated Jun. 7, 2018, for International Application No. PCT/US2018/024185, 9 pages.

International Preliminary Report on Patentability, dated Apr. 30, 2020, for International Application No. PCT/US2018/056577, 8 pages.

European Search Report, dated Jul. 17, 2020, for EP Application No. 18776977.3, 12 pages.

Extended European Search Report, dated Jul. 10, 2020, for EP Application No. 18736738.8, 9 pages.

Gunzung, Kim, et al. (Mar. 2, 2016). "A hybrid 3D LIDAR imager based on pixel-by-pixel scanning and DS-OCDMA," pages Proceedings of SPIE [Proceedings of SPIE ISSN 0277-786X vol. 10524], SPIE, US, vol. 9751, pp. 975119-975119-8.

Extended European Search Report, dated Jul. 22, 2020, for EP Application No. 18736685.1, 10 pages.

Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, 9 pages.

Office Action Issued in Japanese Patent Application No. 2019-536019 dated Nov. 30, 2021, 6 pages.

European Search Report, dated Jun. 17, 2021, for EP Application No. 18868896.4, 7 pages.

"Fiber laser," Wikipedia, https://en.wikipedia.org/wiki/Fiber_laser, 6 pages.

International Search Report and Written Opinion, dated Mar. 19, 2018, for International Application No. PCT/US2018/012705, 12 pages.

International Search Report and Written Opinion, dated Mar. 20, 2018, for International Application No. PCT/US2018/012703, 13 pages.

"Mirrors", Physics LibreTexts, https://phys.libretexts.org/Bookshelves/Optics/Supplemental_Modules_(Components)/Mirrors, (2021), 2 pages.

"Why Wavelengths Matter in Fiber Optics", FirstLight, https://www.firstlight.net/why-wavelengths-matter-in-fiber-optics/, (2021), 5 pages.

SOLID STATE PULSE STEERING IN LIDAR SYSTEMS

CROSS-REFERENCE TO A RELATED APPLICATION

This application is a continuation of U.S. application Ser. No. 16/546,741 filed Aug. 21, 2019, which claims the benefit of U.S. Provisional Application No. 62/724,689, filed Aug. 30, 2018. The entire contents of these applications are hereby incorporated herein by reference for all purposes.

FIELD

This disclosure relates generally to laser scanning and, more particularly, to using solid state pulse steering in laser scanning systems.

BACKGROUND

Light detection and ranging (LiDAR) systems use light pulses to create an image or point cloud of the external environment. Some typical LiDAR systems include a light source, a pulse steering system, and light detector. The light source generates light pulses that are directed by the pulse steering system in particular directions when being transmitted from the LiDAR system. When a transmitted light pulse is scattered by an object, some of the scattered light is returned to the LiDAR system as a returned pulse. The light detector detects the returned pulse. Using the time it took for the returned pulse to be detected after the light pulse was transmitted and the speed of light, the LiDAR system can determine the distance to the object along the path of the transmitted light pulse. The pulse steering system can direct light pulses along different paths to allow the LiDAR system to scan the surrounding environment and produce an image or point cloud. LiDAR systems can also use techniques other than time-of-flight and scanning to measure the surrounding environment.

SUMMARY

LiDAR system and methods discussed herein use a dispersion element or optic that has a refraction gradient that causes a light pulse to be redirected to a particular angle based on its wavelength. The dispersion element can be used to control a scanning path for light pulses being projected as part of the LiDAR's field of view. The dispersion element enables redirection of light pulses without requiring the physical movement of a medium such as mirror or other reflective surface, and in effect further enables at least portion of the LiDAR's field of view to be managed through solid state control. The solid state control can be performed by selectively adjusting the wavelength of the light pulses to control their projection along the scanning path.

In one embodiment, a LiDAR system is provided that includes a first steering system operative to control a first scanning direction of a LiDAR FOV, and a second steering system operative to control a second scanning direction of the LiDAR FOV. The second steering system can include a wavelength based dispersion element operative to redirect light pulses at a redirection angle along the second scanning direction based on a wavelength of the light pulse interfacing with the dispersion element, and an angle detection system operative to determine the redirection angle of each light pulse being redirected by the dispersion element. The system can include a light source operative to output a plurality of light pulses that are controlled by the first and second steering systems to scan the LiDAR FOV, wherein each of the plurality of light pulses has a different wavelength.

In another embodiment, a method for using a LiDAR system is provided that can include selecting one of a plurality of wavelengths such that at least one laser system generates a light pulse based on the selected wavelength, transmitting the light pulse to a prism steering system that redirects the light pulse to a scanning path based on the selected wavelength, wherein a portion of the light pulse passes through a partial reflector, receiving, at a position sensitive device (PSD), a reflection signal from the partial reflector, wherein the reflection signal is a portion of the light pulse that is reflected by the partial reflector, wherein the PSD produces a position signal that is used to determine a field of view (FOV) angle of the scanning path associated with the light pulse having the selected wavelength, and processing a return signal corresponding to the light pulse associated with the determined FOV angle.

In yet another embodiment, a method for using a LiDAR system is provided that can include outputting a plurality of light pulses, wherein each of the plurality of light pulses has a different wavelength, transmitting the plurality of light pulses to a prism steering system that is operative to redirect each of the light pulses at a redirection angle along a scanning direction based on a wavelength of the light pulse interfacing with the prism steering system, determining the redirection angle of each transmitted light pulse, and using the determined redirection angle in connection with each transmitted light pulse to process return pulses.

In yet another embodiment, a LiDAR system is provided that includes a steering system operative to control a first scanning direction of a LiDAR FOV. The steering system includes a wavelength based dispersion element operative to redirect light pulses at a redirection angle along the second scanning direction based on a wavelength of the light pulse interfacing with the dispersion element; and an angle detection system operative to determine the redirection angle of each light pulse being redirected by the dispersion element. The LiDAR system includes a light source operative to output a plurality of light pulses that are controlled by the steering system to scan the LiDAR FOV, wherein each of the plurality of light pulses have a different wavelength; and a motor operative to rotate the LiDAR system about an axis that is co-aligned with an incident angle of a path existing between the light source and the steering system, wherein the LiDAR FOV includes 360 degrees.

BRIEF DESCRIPTION OF THE DRAWINGS

The present application can be best understood by reference to the figures described below taken in conjunction with the accompanying drawing figures, in which like parts may be referred to by like numerals.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some light detection and ranging (LiDAR) systems using a single light source to produce pulse of a single wavelength that scan the surrounding environment. The pulses are scanned using steering systems direct the pulses in one or two dimensions to cover an area of the surround environment (the scan area). When these systems use mechanical means to direct the pulses, the system complexity increases because more moving parts are required. Additionally, only a single pulse can be emitted at any one time because two or more identical pulses would introduce ambiguity in returned pulses. In some embodiments of the present technology, these disadvantages and/or others are overcome.

For example, some embodiments of the present technology use two light sources that produce pulses of different wavelengths. These light sources provide the pulses to a pulse steering system at different angles so that the scan area for each light source is different. This allows for tuning the light source to appropriate powers and the possibility of having overlapping scan areas that cover scans of different distances. Longer ranges can be scanned with pulses having higher power and/or slower repetition rate. Shorter ranges can be scanned with pulses having lower power and/or high repetition rate to increase point density.

As another example, some embodiments of the present technology use pulse steering systems with one or more dispersion elements (e.g., gratings, optical combs, prisms, etc.) to direct pulses based on the wavelength of the pulse. A dispersion element can make fine adjustments to a pulse's optical path, which may be difficult or impossible with mechanical systems. Additionally, using one or more dispersion elements allows the pulse steering system to use few mechanical components to achieve the desired scanning capabilities. This results in a simpler, more efficient (e.g., lower power) design that is potentially more reliable (due to few moving components).

Figure 1:
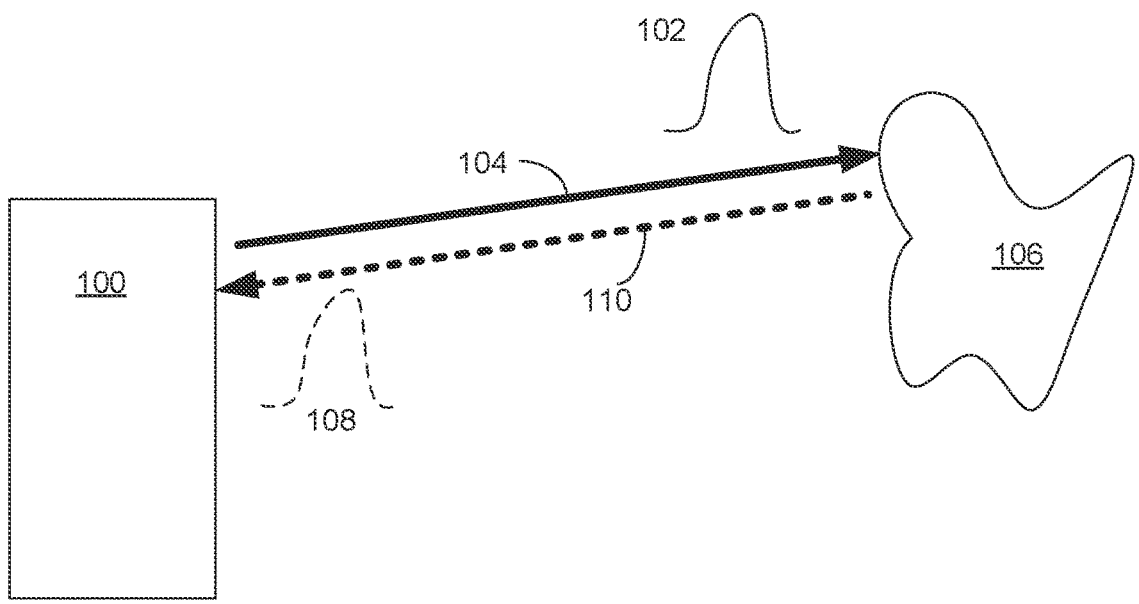
FIGS. 1-3 illustrate an exemplary LiDAR system using pulse signal to measure distances to points in the outside environment.

Some LiDAR systems use the time-of-flight of light signals (e.g., light pulses) to determine the distance to objects in the path of the light. For example, with respect to FIG. 1, an exemplary LiDAR system 100 includes a laser light source (e.g., a fiber laser), a steering system (e.g., a system of one or more moving mirrors), and a light detector (e.g., a photon detector with one or more optics). LiDAR system 100 transmits light pulse 102 along path 104 as determined by the steering system of LiDAR system 100. In the depicted example, light pulse 102, which is generated by the laser light source, is a short pulse of laser light. Further, the signal steering system of the LiDAR system 100 is a pulse signal steering system. However, it should be appreciated that LiDAR systems can operate by generating, transmitting, and detecting light signals that are not pulsed and/use derive ranges to object in the surrounding environment using techniques other than time-of-flight. For example, some LiDAR systems use frequency modulated continuous waves (i.e., "FMCW"). It should be further appreciated that any of the techniques described herein with respect to time-of-flight based systems that use pulses also may be applicable to LiDAR systems that do not use one or both of these techniques.

Referring back to FIG. 1 (a time-of-flight LiDAR system that uses light pulses) when light pulse 102 reaches object 106, light pulse 102 scatters and returned light pulse 108 will be reflected back to system 100 along path 110. The time from when transmitted light pulse 102 leaves LiDAR system 100 to when returned light pulse 108 arrives back at LiDAR system 100 can be measured (e.g., by a processor or other electronics within the LiDAR system). This time-of-flight combined with the knowledge of the speed of light can be used to determine the range/distance from LiDAR system 100 to the point on object 106 where light pulse 102 scattered.

Figure 2:
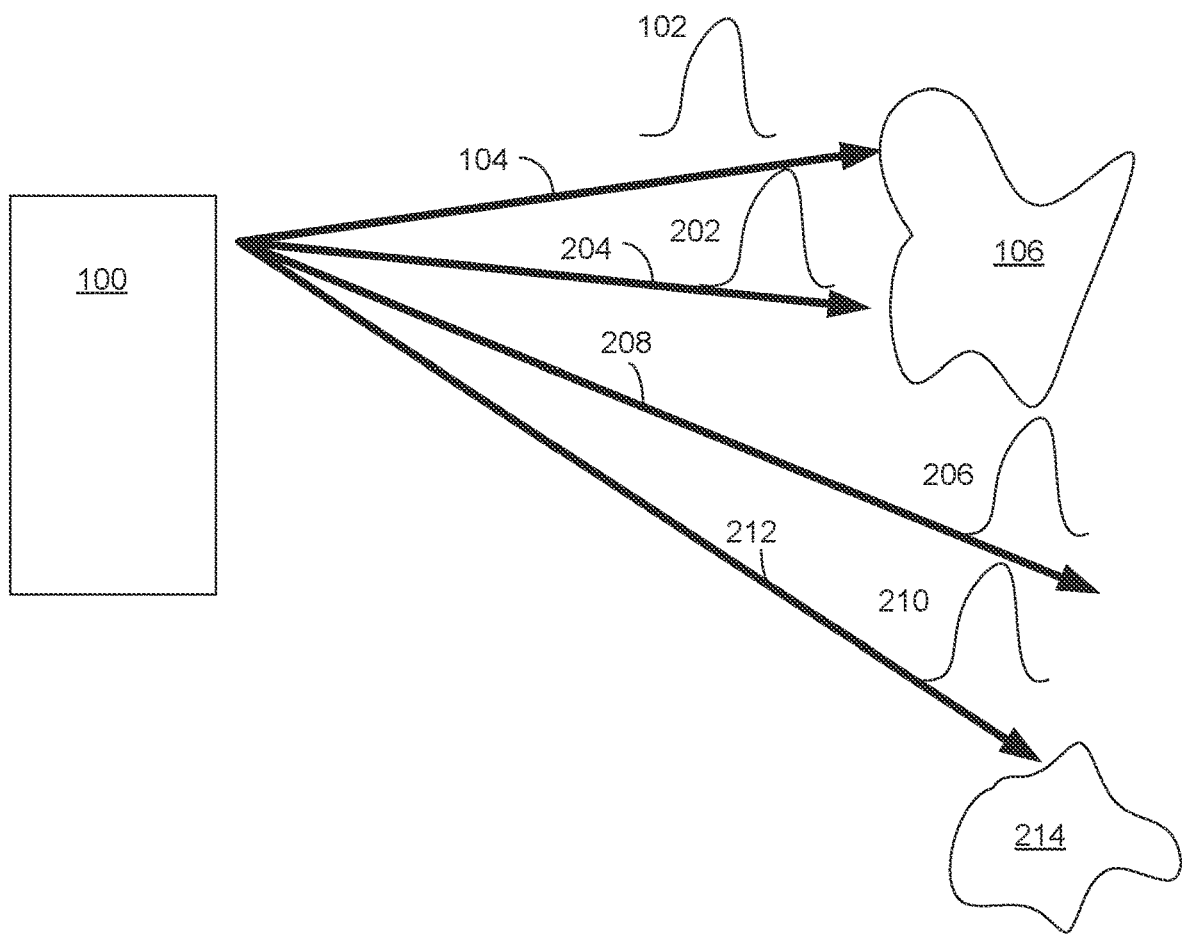
Figure 3:
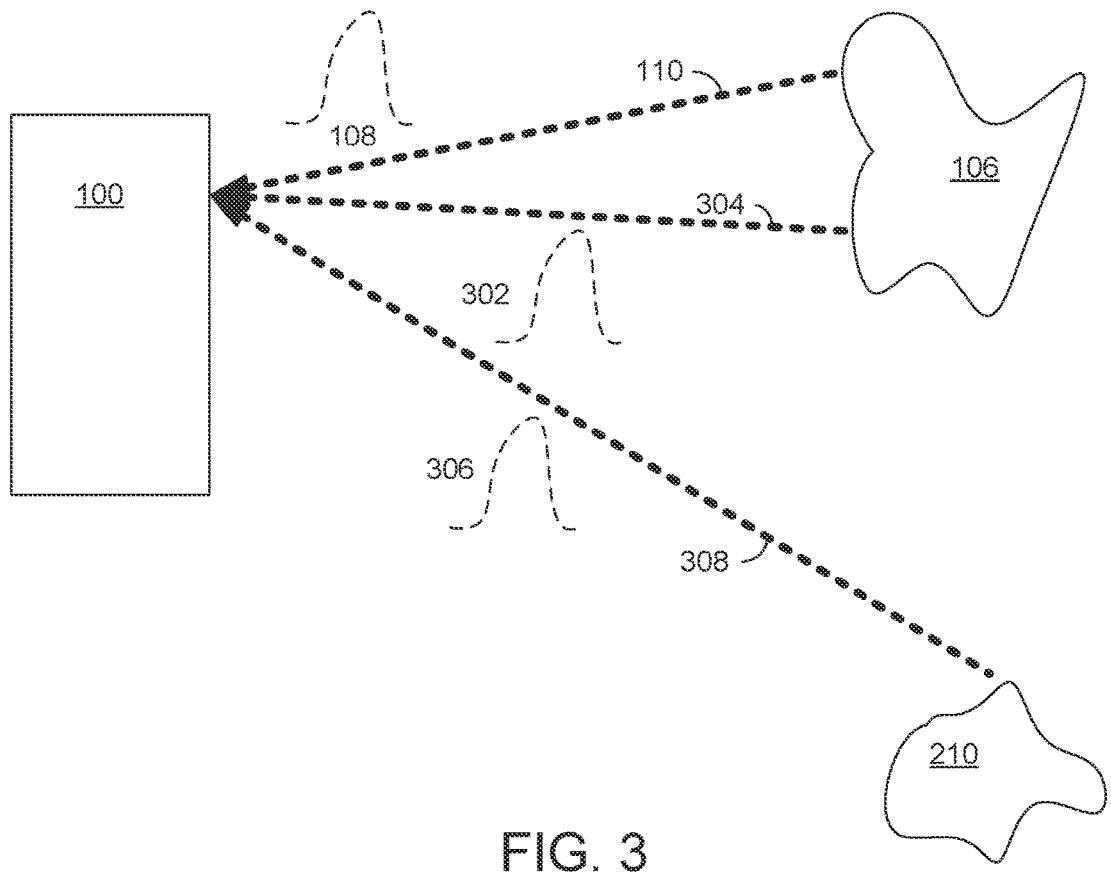

By directing many light pulses, as depicted in FIG. 2, LiDAR system 100 scans the external environment (e.g., by directing light pulses 102, 202, 206, 210 along paths 104, 204, 208, 212, respectively). As depicted in FIG. 3, LiDAR system 100 receives returned light pulses 108, 302, 306 (which correspond to transmitted light pulses 102, 202, 210, respectively) back after objects 106 and 214 scatter the transmitted light pulses and reflect pulses back along paths 110, 304, 308, respectively. Based on the direction of the transmitted light pulses (as determined by LiDAR system 100) as well as the calculated range from LiDAR system 100 to the points on objects that scatter the light pulses (e.g., the points on objects 106 and 214), the surroundings within the detection range (e.g., the field of view between path 104 and 212, inclusively) can be precisely plotted (e.g., a point cloud or image can be created).

If a corresponding light pulse is not received for a particular transmitted light pulse, then it can be determined that there are no objects within a certain range of LiDAR system 100 (e.g., the max scanning distance of LiDAR system 100). For example, in FIG. 2, light pulse 206 will not have a corresponding returned light pulse (as depicted in FIG. 3) because it did not produce a scattering event along its transmission path 208 within the predetermined detection range. LiDAR system 100 (or an external system communication with LiDAR system 100) can interpret this as no object being along path 208 within the detection range of LiDAR system 100.

In FIG. 2, transmitted light pulses 102, 202, 206, 210 can be transmitted in any order, serially, in parallel, or based on other timings with respect to each other. Additionally, while FIG. 2 depicts a 1-dimensional array of transmitted light pulses, LiDAR system 100 optionally also directs similar arrays of transmitted light pulses along other planes so that a 2-dimensional array of light pulses is transmitted. This 2-dimensional array can be transmitted point-by-point, line-by-line, all at once, or in some other manner. The point cloud or image from a 1-dimensional array (e.g., a single horizontal line) will produce 2-dimensional information (e.g., (1) the horizontal transmission direction and (2) the range to objects). The point cloud or image from a 2-dimensional array will have 3-dimensional information (e.g., (1) the horizontal transmission direction, (2) the vertical transmission direction, and (3) the range to objects).

The density of points in point cloud or image from a LiDAR system 100 is equal to the number of pulses divided by the field of view. Given that the field of view is fixed, to increase the density of points generated by one set of transmission-receiving optics, the LiDAR system should fire a pulse more frequently, in other words, a light source with a higher repetition rate is needed. However, by sending pulses more frequently the farthest distance that the LiDAR system can detect may be more limited. For example, if a returned signal from a far object is received after the system transmits the next pulse, the return signals may be detected in a different order than the order in which the corresponding signals are transmitted and get mixed up if the system cannot correctly correlate the returned signals with the transmitted signals. To illustrate, consider an exemplary LiDAR system that can transmit laser pulses with a repetition rate between 500 kHz and 1 MHz. Based on the time it takes for a pulse to return to the LiDAR system and to avoid mix-up of returned pulses from consecutive pulses in conventional LiDAR design, the farthest distance the LiDAR system can detect may be 300 meters and 150 meters for 500 kHz and 1 Mhz, respectively. The density of points of a LiDAR system with 500 kHz repetition rate is half of that with 1 MHz. Thus, this example demonstrates that, if the system cannot correctly correlate returned signals that arrive out of order, increasing the repetition rate from 500 kHz to 1 Mhz (and thus improving the density of points of the system) would significantly reduce the detection range of the system.

Figure 4:
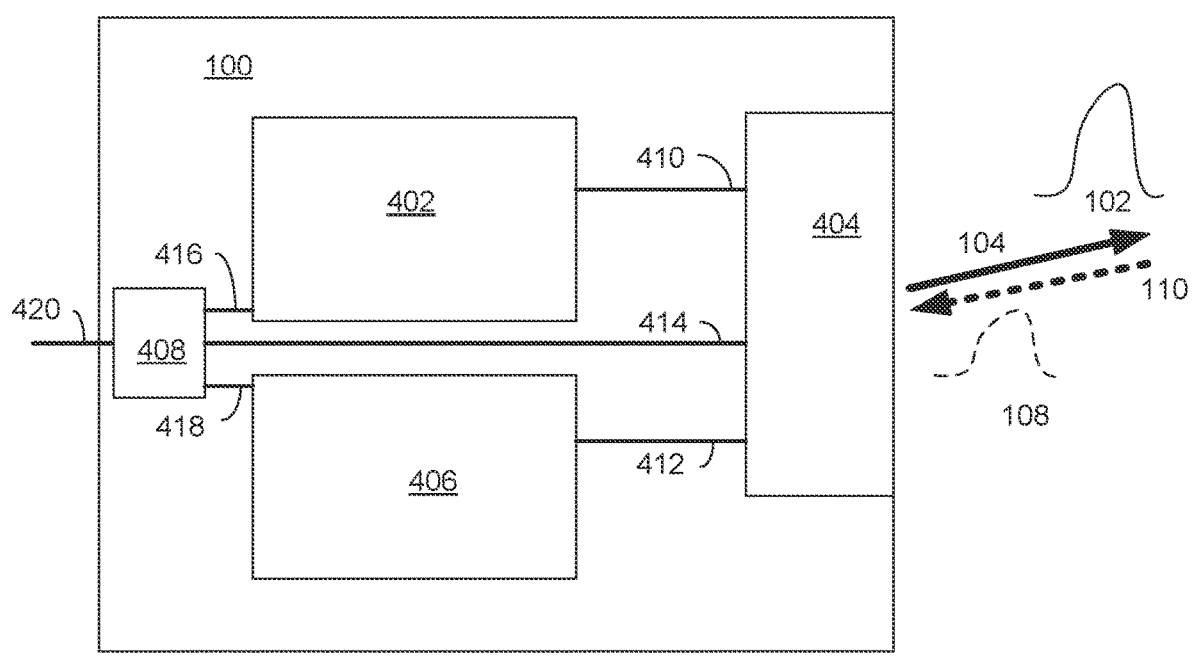
FIG. 4 depicts a logical block diagram of the exemplary LiDAR system.

FIG. 4 depicts a logical block diagram of LiDAR system 100, which includes light source 402, signal steering system 404, pulse detector 406, and controller 408. These components are coupled together using communications paths 410, 412, 414, 416, and 418. These communications paths represent communication (bidirectional or unidirectional) among the various LiDAR system components but need not be physical components themselves. While the communications paths can be implemented by one or more electrical wires, busses, or optical fibers, the communication paths can also be wireless channels or open-air optical paths so that no physical communication medium is present. For example, in one exemplary LiDAR system, communication path 410 is one or more optical fibers, communication path 412 represents an optical path, and communication paths 414, 416, 418, and 420 are all one or more electrical wires that carry electrical signals. The communications paths can also include more than one of the above types of communication mediums (e.g., they can include an optical fiber and an optical path or one or more optical fibers and one or more electrical wires).

LiDAR system 100 can also include other components not depicted in FIG. 4, such as power buses, power supplies, LED indicators, switches, etc. Additionally, other connections among components may be present, such as a direct connection between light source 402 and light detector 406 so that light detector 406 can accurately measure the time from when light source 402 transmits a light pulse until light detector 406 detects a returned light pulse.

Figure 5:
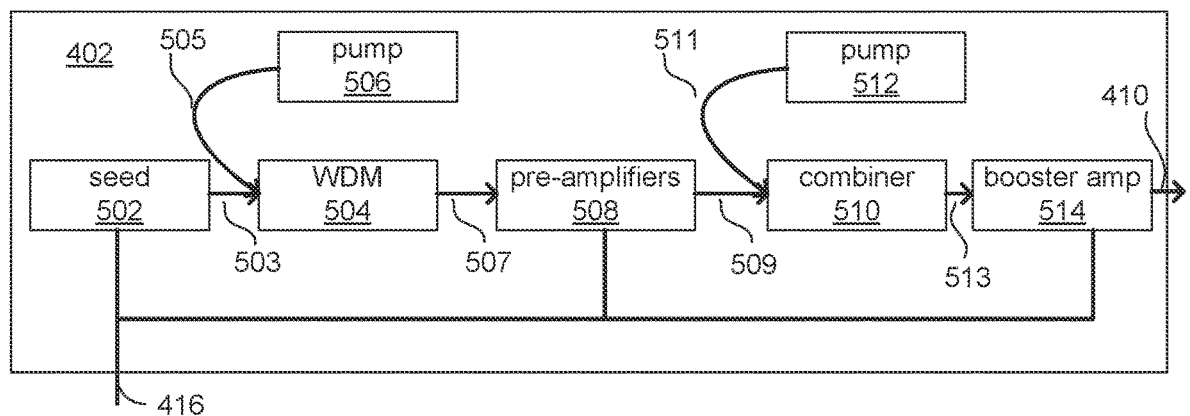
FIG. 5 depicts a light source of the exemplary LiDAR system.

FIG. 5 depicts a logical block diagram of one example of light source 402 that is based on a laser fiber, although any number of light sources with varying architecture could be used as part of the LiDAR system. Light source 402 uses seed 502 to generate initial light pulses of one or more wavelengths (e.g., 1550 nm), which are provided to wavelength-division multiplexor (WDM) 504 via fiber 503. Pump 506 also provides laser power (of a different wavelength, such as 980 nm) to WDM 504 via fiber 505. The output of WDM 504 is provided to pre-amplifiers 508 (which includes one or more amplifiers) which provides its output to combiner 510 via fiber 509. Combiner 510 also takes laser power from pump 512 via fiber 511 and provides pulses via fiber 513 to booster amplifier 514, which produces output light pulses on fiber 410. The outputted light pulses are then fed to steering system 404. In some variations, light source 402 can produce pulses of different amplitudes based on the fiber gain profile of the fiber used in the source. Communication path 416 couples light source 402 to controller 408 (FIG. 4) so that components of light source 402 can be controlled by or otherwise communicate with controller 408. Alternatively, light source 402 may include its own controller. Instead of controller 408 communicating directly with components of light source 402, a dedicated light source controller communicates with controller 408 and controls and/or communicates with the components of light source 402. Light source 402 also includes other components not shown, such as one or more power connectors, power supplies, and/or power lines.

Some other light sources include one or more laser diodes, short-cavity fiber lasers, solid-state lasers, and/or tunable external cavity diode lasers, configured to generate one or more light signals at various wavelengths. In some examples, light sources use amplifiers (e.g., pre-amps or booster amps) include a doped optical fiber amplifier, a solid-state bulk amplifier, and/or a semiconductor optical amplifier, configured to receive and amplify light signals.

Returning to FIG. 4, signal steering system 404 includes any number of components for steering light signals generated by light source 402. In some examples, signal steering system 404 may include one or more optical redirection elements (e.g., mirrors or lens) that steer light pulses (e.g., by rotating, vibrating, or directing) along a transmit path to scan the external environment. For example, these optical redirection elements may include MEMS mirrors, rotating polyhedron mirrors, or stationary mirrors to steer the transmitted pulse signals to different directions. Signal steering system 404 optionally also includes other optical components, such as dispersion optics (e.g., diffuser lenses, prisms, or gratings) to further expand the coverage of the transmitted signal in order to increase the LiDAR system 100's transmission area (i.e., field of view). In some examples, signal steering system 404 does not contain any active optical components (e.g., it does not contain any amplifiers). In some other examples, one or more of the components from light source 402, such as a booster amplifier, may be included in signal steering system 404. In some instances, signal steering system 404 can be considered a LiDAR head or LiDAR scanner.

Some implementations of signal steering systems include one or more optical redirection elements (e.g., mirrors or lens) that steers returned light signals (e.g., by rotating, vibrating, or directing) along a receive path to direct the returned light signals to the light detector. The optical redirection elements that direct light signals along the transmit and receive paths may be the same components (e.g., shared), separate components (e.g., dedicated), and/or a combination of shared and separate components. This means that in some cases the transmit and receive paths are different although they may partially overlap (or in some cases, substantially overlap).

Figure 6:
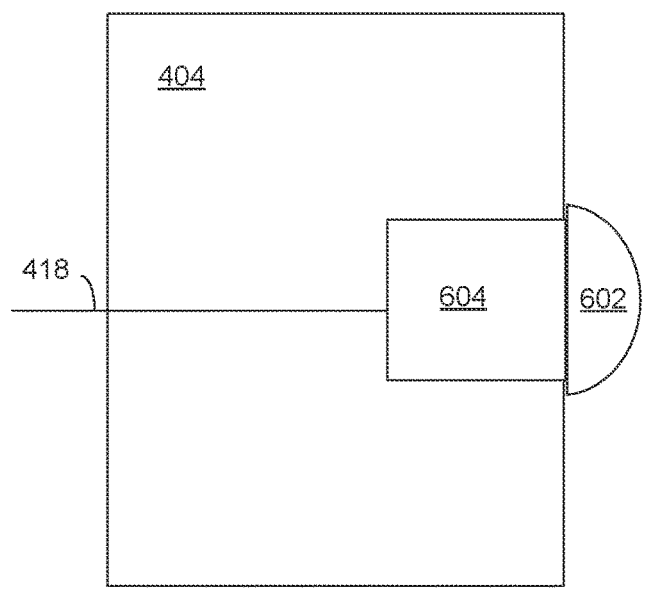
FIG. 6 depicts a light detector of the exemplary LiDAR system.

FIG. 6 depicts a logical block diagram of one possible arrangement of components in light detector 404 of LiDAR system 100 (FIG. 4). Light detector 404 includes optics 604 (e.g., a system of one or more optical lenses) and detector 602 (e.g., a charge coupled device (CCD), a photodiode, an avalanche photodiode, a photomultiplier vacuum tube, an image sensor, etc.) that is connected to controller 408 (FIG. 4) via communication path 418. The optics 604 may include one or more photo lenses to receive, focus, and direct the returned signals. Light detector 404 can include filters to selectively pass light of certain wavelengths. Light detector 404 can also include a timing circuit that measures the time from when a pulse is transmitted to when a corresponding returned pulse is detected. This data can then be transmitted to controller 408 (FIG. 4) or to other devices via communication line 418. Light detector 404 can also receive information about when light source 402 transmitted a light pulse via communication line 418 or other communications lines that are not shown (e.g., an optical fiber from light source 402 that samples transmitted light pulses). Alternatively, light detector 404 can provide signals via communication line 418 that indicate when returned light pulses are detected. Other pulse data, such as power, pulse shape, and/or wavelength, can also be communicated.

Returning to FIG. 4, controller 408 contains components for the control of LiDAR system 100 and communication with external devices that use the system. For example, controller 408 optionally includes one or more processors, memories, communication interfaces, sensors, storage devices, clocks, ASICs, FPGAs, and/or other devices that control light source 402, signal steering system 404, and/or light detector 406. In some examples, controller 408 controls the power, rate, timing, and/or other properties of light signals generated by light source 402; controls the speed, transmit direction, and/or other parameters of light steering system 404; and/or controls the sensitivity and/or other parameters of light detector 406.

Controller 408 optionally is also configured to process data received from these components. In some examples, controller determines the time it takes from transmitting a light pulse until a corresponding returned light pulse is received; determines when a returned light pulse is not received for a transmitted light pulse; determines the transmitted direction (e.g., horizontal and/or vertical information) for a transmitted/returned light pulse; determines the estimated range in a particular direction; and/or determines any other type of data relevant to LiDAR system 100.

Figure 7:
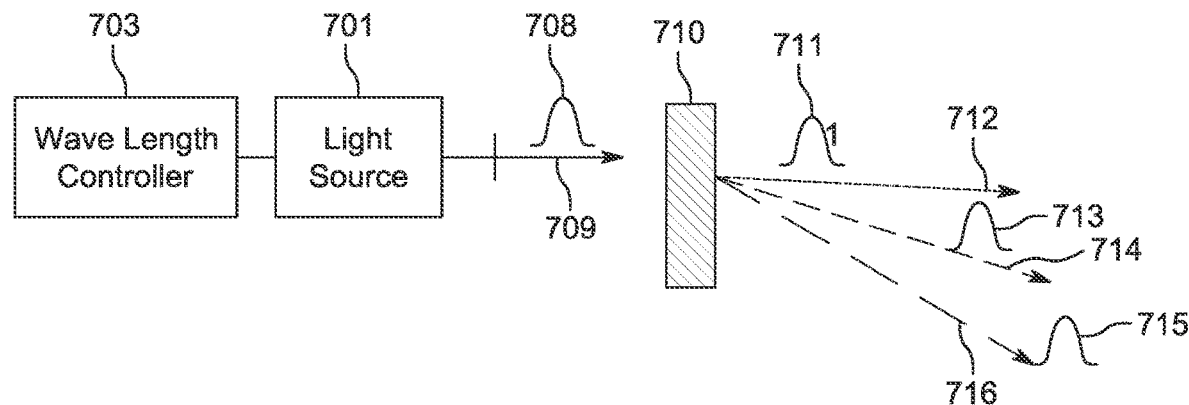
FIGS. 7 and 8 depict parts of a LiDAR system according to some embodiments.
Figure 8:
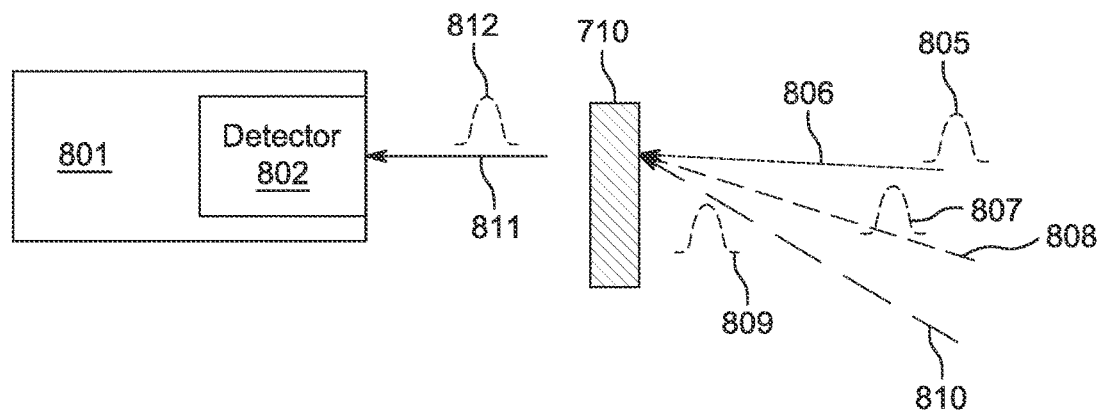

FIGS. 7 and 8 depict parts of a LiDAR system according to some embodiments. In FIG. 7, light source 701 is operative to provide output pulses 708 along path 709 in the direction of dispersion element 710. Light source 701 may be similar to light source 402, for example. Light source 701 may be controlled by wavelength controller 703 so that light source 701 is instructed to output pulses with varying wavelengths. For example, in one embodiment, the wavelengths may range from 1510 nm to 1580 nm. The output pulses are provided along path 709 to dispersion element 710. Path 709 may include other components (e.g., such as a gavel or mirror) that are operative to direct the output pulses to the dispersion element 710, but are omitted to avoid overcrowding the drawing. Such additional components are shown and discussed in more detail below. Based on the wavelength of a particular pulse, dispersion optic 710 directs that pulse along a path that is directly related to that pulse's wavelength. For example, FIG. 7 shows pulses 711, 713, and 715 originating from light source 701 and traveling along path 709. Each of pulses 711, 713, and 715 has a different wavelength. When each of pulses 711, 713, and 715 interact with dispersion element 710, dispersion element 710 directs the pulses down a path associated with the pulse's wavelength, shown as paths 712, 714, and 716, respectively. Dispersion element 710 redirects the light pulses based on wavelength. By sweeping through a series of different wavelengths for the output pulses, a LiDAR system can leverage dispersion element 710 to project scanning pulses along a line in a field of view of the LiDAR system. Additional components (e.g., moving mirror or gavel and/or rotating polygons) can be used to expand the scan pattern to two dimensions.

FIG. 8 depicts a portion of the receive path of the LiDAR system from FIG. 7. In FIG. 8, return pulses 805, 807, and 809 associated with pulses 711, 713, and 715, respectively, travel along optical paths 806, 808, and 810, respectively, back to the dispersion element 710. Optical paths 806, 808, and 810 are similar or the same as optical paths 712, 714, and 716, respectively. Dispersion element 710 redirects return pulses 805, 807, and 809 along optical path 811 (similar to return pulse 812) so that detector 802 of light detector 801 can detect the return pulses and LiDAR system can calculate ranges associated with the pulses.

Figure 9:
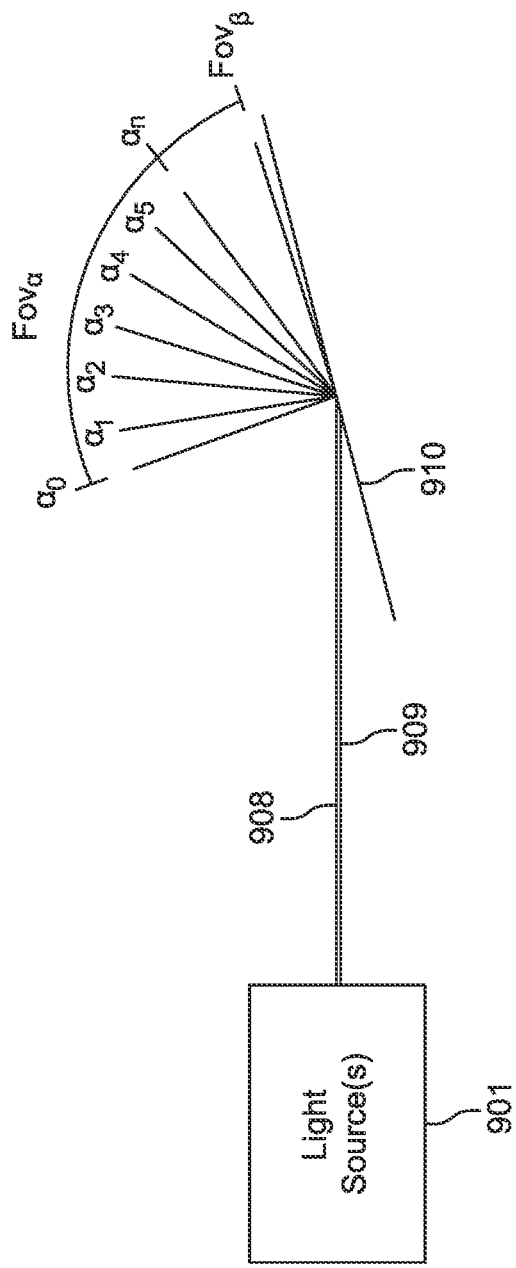
FIG. 9 shows illustrative an light source and dispersion element according an embodiment.

FIG. 9 shows illustrative light source 901 and dispersion element 910. Light source 901 is operative to transmit several light pulses along path 909 to dispersion element 910. Light source 901 can transmit light pulses with different wavelengths, shown as α0 to αn, with α1, α2, α3, α4, and α5 in between. As the light source 901 sweeps through the range of wavelengths, this range of wavelengths, the light pulses cover field of view range 1 ($FOV_\alpha$). An advantage of using dispersion element 910 to cover a field of view is that is can be used in lieu of a mechanical apparatus (e.g., such as a rotating polygon). This eliminates the need for moving parts needed to capture the field of view (e.g., $FOV_\alpha$). This provides further advantages of reduced size, lower power consumption, and lower cost.

If desired, the field of view can be expanded by adding additional light sources that sweep through a different range of existing angle. For example, light sources 901 can include two light sources, one that sweeps through the alpha range to provide $FOV_\alpha$ and another one that sweeps through a beta range of wavelengths to provide $FOV_\beta$. As shown, the alpha light source travels along path 909 and the beta light source travels along path 908. Paths 908 and 909 have angle offset with respect to each other. It should be understood that although $FOV_\alpha$ and $FOV_\beta$ are shown to be adjacent to each other, both $FOV_\alpha$ and $FOV_\beta$ can be interlaced to increase scanning density, for example, for a range of interest within a general FOV.

It may be desirable to use multiple light sources, as opposed to just one light source, to sweep through a desired range of wavelengths. This may be because the ability to precisely and quickly control the wavelength of output light pulses is difficult based on the current state of the art laser systems. In some cases, the wavelengths generated by a light source, and therefore the dispersion angles, may be either too slow or too inaccurate for the design requirements of a LiDAR system. If the wavelength sweep is too slow, the LiDAR system performance may be inadequate. If the wavelength accuracy is too low, the angles of light reflecting from a dispersion element and returning to a detection system such as detector 802 may be unknown. This inaccuracy may cause the LiDAR system to incorrectly detect the position of objects in the environment. What is needed is the ability to use a laser that can rapidly sweep through a desired range of wavelengths and the LiDAR system knows exactly where the light pulses are being transmitted within the FOV.

Figure 10:
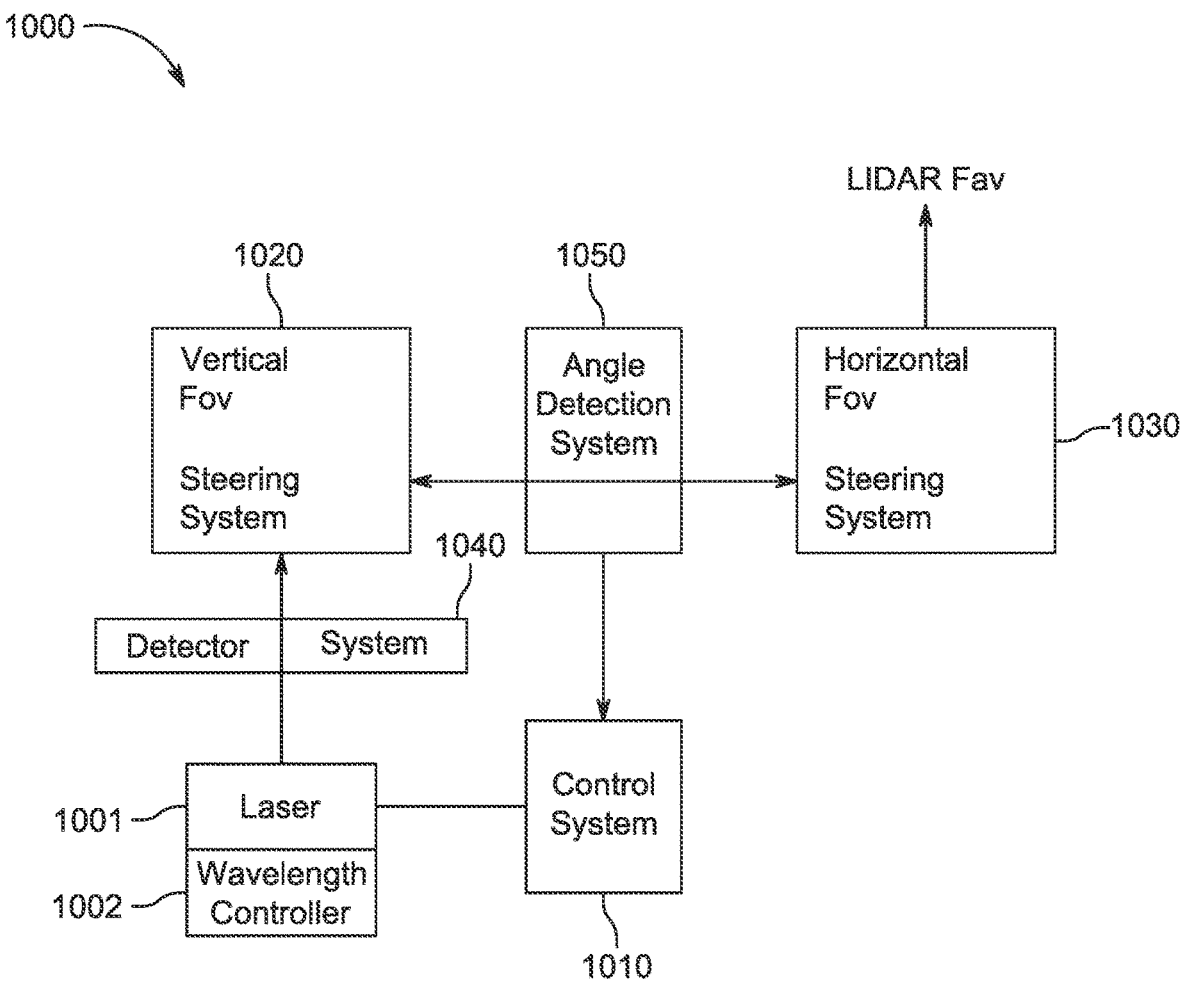
FIG. 10 shows illustrative LiDAR steering system according to an embodiment.

FIG. 10 shows illustrative LiDAR steering system 1000 according to an embodiment. Steering system 1000 can include laser source 1001, wavelength controller 1002, control system 1010, vertical FOV steering system 1020, horizontal FOV steering system 1030, detector system 1040, and angle detection system 1050. Laser source 1001 is operative provide light pulses of varying wavelengths (under the control of wavelength controller 1002) to vertical FOV steering system 1020, which then redirects the light pulses to horizontal FOV steering system 1030, which then directs the light pulse to a scanning FOV of the LiDAR system. Return pulses are routed to detector system 1040 via horizontal FOV steering system 1030 and vertical FOV steering system 1020. Light source 1001 may be similar to light source 402 and detector system may be similar to detector 404. Light source 1001 may include one or more laser sources. The laser source can change the wavelength of the light pulses by changing the seed laser wavelength (e.g., adjusting an applied current if the laser source is a distributed Bragg reflector (DBR) laser, using tunable filter if the laser source is broadband, or scanning reflecting mirror position to change the laser cavity length, etc.). In addition, the line width of each light pulse may be controlled so that divergence is controlled.

Vertical FOV steering system 1020 may be responsible for controlling the vertical scanning position of the LiDAR FOV. That is, if the LiDAR FOV is defined by X and Y axes, the vertical scanning position may correspond to the Y axis, and the horizontal scanning position may correspond to the X axis. Steering system 1020 may include a dispersion element (e.g., dispersion element 910) or a prism, gradient, or any other member that redirects light based on its wavelength. Thus, wavelength based redirection principles discussed in FIGS. 7-9 can be employed by vertical FOV steering system 1020. The incident angle of the light pulses interacting with the dispersion element in steering system 1020 may be precisely aligned to ensure that the desired redirection angles are achieved. Steering system 1030 can take the place of a traditional rotating polygon, gavel, or other moving mirror structure. Horizontal FOV steering system 1030 may be responsible for controlling the horizontal scanning position of the LiDAR FOV. In some embodiments, steering system 1030 may be a gavel, mirror, rotating polygon, or other mirror structure that moves under the direction of a motor.

It should be understood that the horizontal and vertical scanning responsibilities of steering systems 1020 and 1030 can be reversed. That is, steering system 1020 may scan in the horizontal FOV and steering system 1030 may scan in the vertical FOV. Regardless of scanning orientation between steering system 1020 and 1030, the first steering system that receives light pulses from laser 1001 includes the dispersion element. In some embodiments, both steering systems 1020 and 1030 may use dispersion elements.

Angle detection system 1050 is operative to reflect a small percentage of the light pulse being redirected by steering system 1020 and allow a remainder or large percentage of light pulse to pass through to steering system 1030, which then directs the light pulses to the environment for object detection as part of the LiDAR FOV. The small percentage of reflected light is directed to a position sensitive device (PSD), which is able to calculate the angle of light being redirected by vertical FOV steering system 1020. Angle detection system 1050 can provide the calculated angle to control system 1010 so that the angle information can be correlated with the position of the light pulse transmission within the LiDAR FOV. The use of angle detection system 1050 eases the constraints on the laser 1001 and wavelength controller 1002 to provide extremely accurate wavelengths because the angle produced by the dispersion element is now measured. This enables fast wavelength sweep and accounts for any wavelength inaccuracies.

Figure 11:
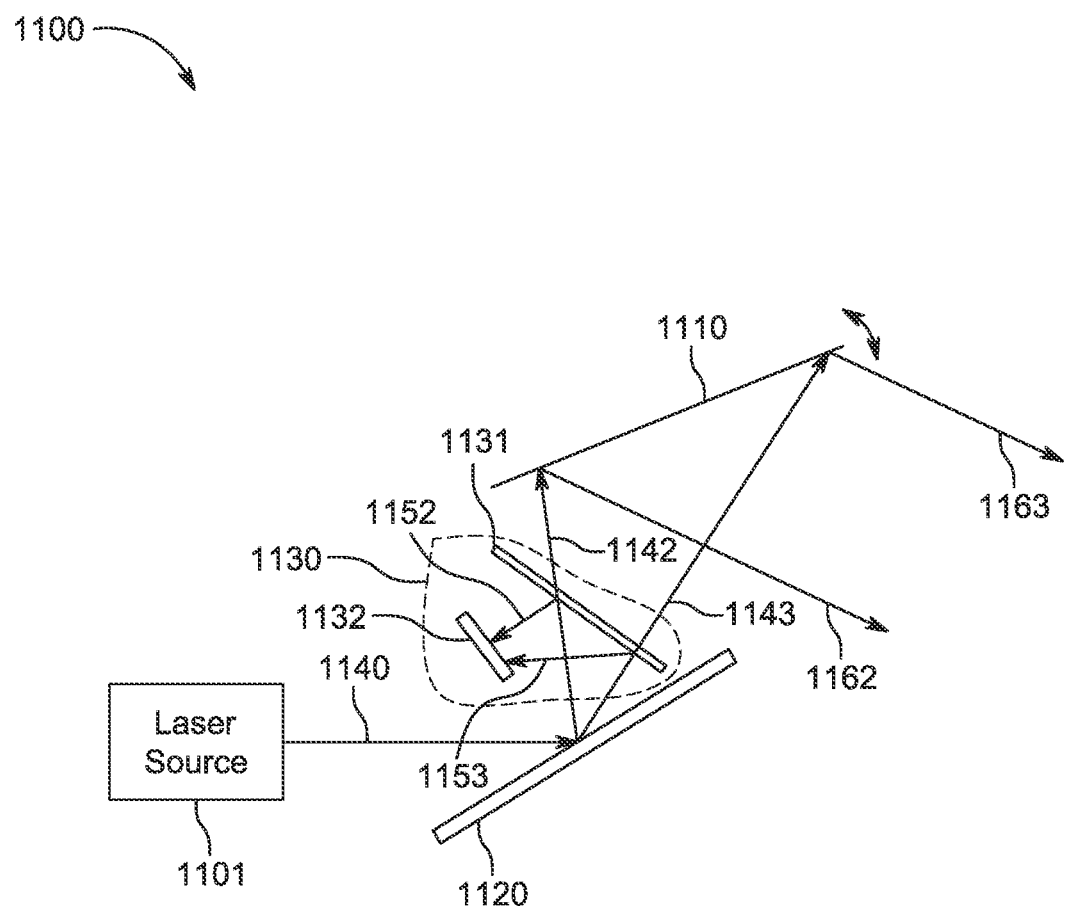
FIG. 11 shows illustrative LiDAR steering system according to an embodiment.

FIG. 11 shows illustrative LiDAR steering system 1100 according to an embodiment. System 1100 includes laser source 1101, moving mirror structure 1110, dispersion element 1120, and angle detection system 1130, which includes partial reflector 1131 and PSD 1132. Light pulses originating from laser source 1101 travels along path 1140 to dispersion element 1120, which redirects that light along a path commensurate with the wavelength of the light pulse. Two illustrative redirection paths are shown to illustrate wavelength based redirection, shown as paths 1142 and 1143. Both paths 1142 and 1143 interface with partial reflector 1131 and moving mirror structure 1110, with a majority of the light pulses passing through partial reflector 1131 as they travel to structure 1110. Moving mirror structure 1110 can be a gavel, mirror, or polygon and is operative to further redirect the light pulses along paths 1162 and 1163. Path 1162 and 1163 may represent the paths the light pulses follow to scan an environment external to LiDAR system 1110. In one embodiment, dispersion element 1120 may be responsible controlling the vertical FOV and moveable mirror structure may be responsible for controlling the horizontal FOV.

A portion of each light pulse interfacing with partial reflector 1131 is reflected back to PSD 1132, shown as path 1152 or 1153. PSD 1132 can detect the reflected light pulses via paths 1152 and 1153, and based on the location of where the reflected light is detected on PSD 1132, PSD 1132 can report this location to control circuitry (not shown) which is be able to correlate the location with an angle of the light pulse being redirected by dispersion element 1120. As laser source 1101 sweeps through a range of wavelengths, the reflected light is detected by PSD 1132 and the actual angle of each light pulse being redirected by dispersion element 1120 is determined and used for object detection for any return pulses.

Figure 12:
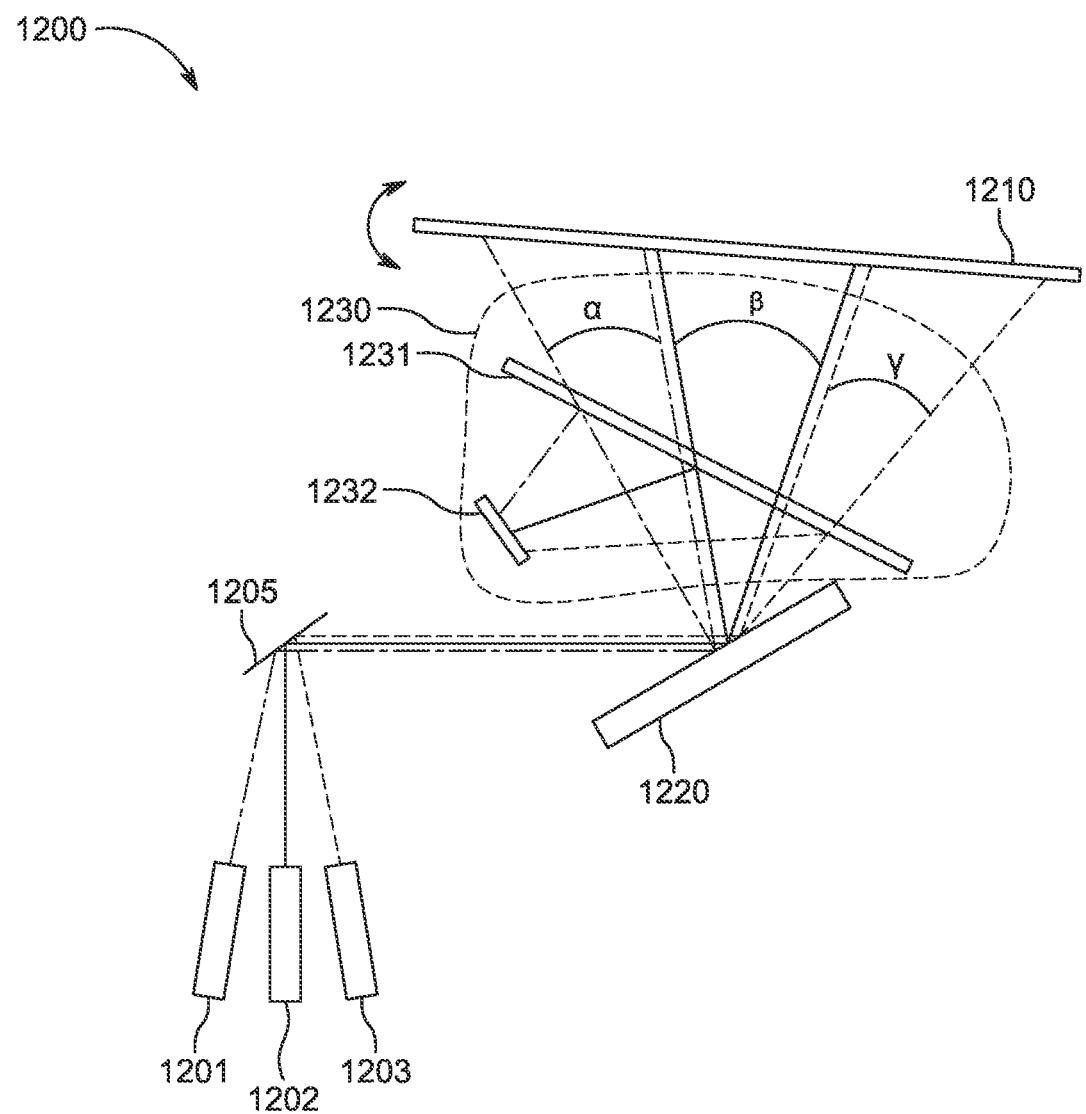
FIG. 12 shows illustrative LiDAR steering system according to an embodiment.

FIG. 12 shows illustrative LiDAR steering system 1200 according to an embodiment. System 1100 includes laser sources 1201-1203, fixed position mirror 1205, gavel 1210, dispersion element 1120, and angle detection system 1230, which includes partial reflector 1231 and PSD 1232. Multiple light sources are shown to show how the FOV can be increased to cover a larger FOV or to provide more data points within a given FOV. Each light source 1201-1203 can vary in wavelength. As shown, light source 1201 can vary in wavelength such that it redirection angles can exist with the alpha range (shown as α), light source 1202 can vary in wavelength such that it redirection angles can exist with the beta range (shown as β), light source 1203 can vary in wavelength such that it redirection angles can exist with the gamma range (shown as γ). Each redirected light pulse is partially reflected back to PSD 1232 (a few examples of which are shown). As shown, light pulses being emitted by laser sources 1201-1203 travel a path similar to that shown in FIG. 11. A fixed position mirror 1205 has been added, but the dispersion element receives the light pulses before gavel 1210 does. The beam paths exiting gavel 1210 are not shown.

Figure 13A:
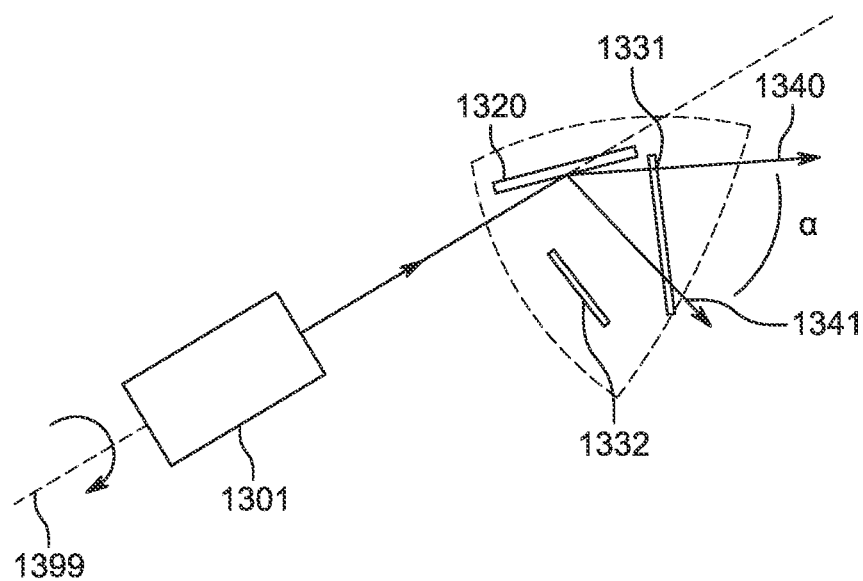
FIGS. 13A-13C show different views of a LiDAR steering system according to an embodiment.
Figure 13B:
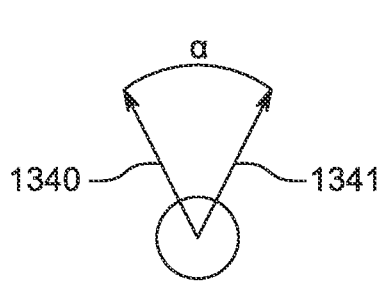
Figure 13C:
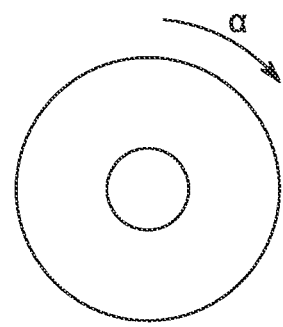

FIG. 13A shows LiDAR steering system 1300 oriented with respect axis 1399 according to an embodiment. System 1300 can include laser source 1301, dispersion element 1320, reflector 1331, and PSD 1332. Two illustrative light pulses, shown by paths 1340 and 1341 show the FOV range (shown by a) obtained by varying the wavelength of the light pulses originating by laser source 1301. FIG. 13B shows an illustrative top view of system 1300, with particular emphasis on only showing light paths 1340 and 1341. FIG. 13B illustrates the vertical FOV obtained using varying wavelength light pulses in connection with dispersion element 1331 according to embodiments herein. If desired, the entirety of system 1300 can rotated around axis 1399 to increase the horizontal FOV. Note that axis 1399 is co-aligned with the incident angle of the light pulses originating from laser source 1301 and interfacing with dispersion element 1320. For example, FIG. 13C shows that by fully rotating system 1300 about axis 1399, a 360 degree FOV can be obtained.

In another embodiment, multiple instances of system 1300 can be arranged to achieve a 360 FOV or other desire FOV without having to rotate system 1300 around axis 1399. For example, assume that the alpha FOV is 120 degrees. Two other system 1300s can be used to provide the remaining 240 degrees of the 360 degree FOV.

Figure 14:
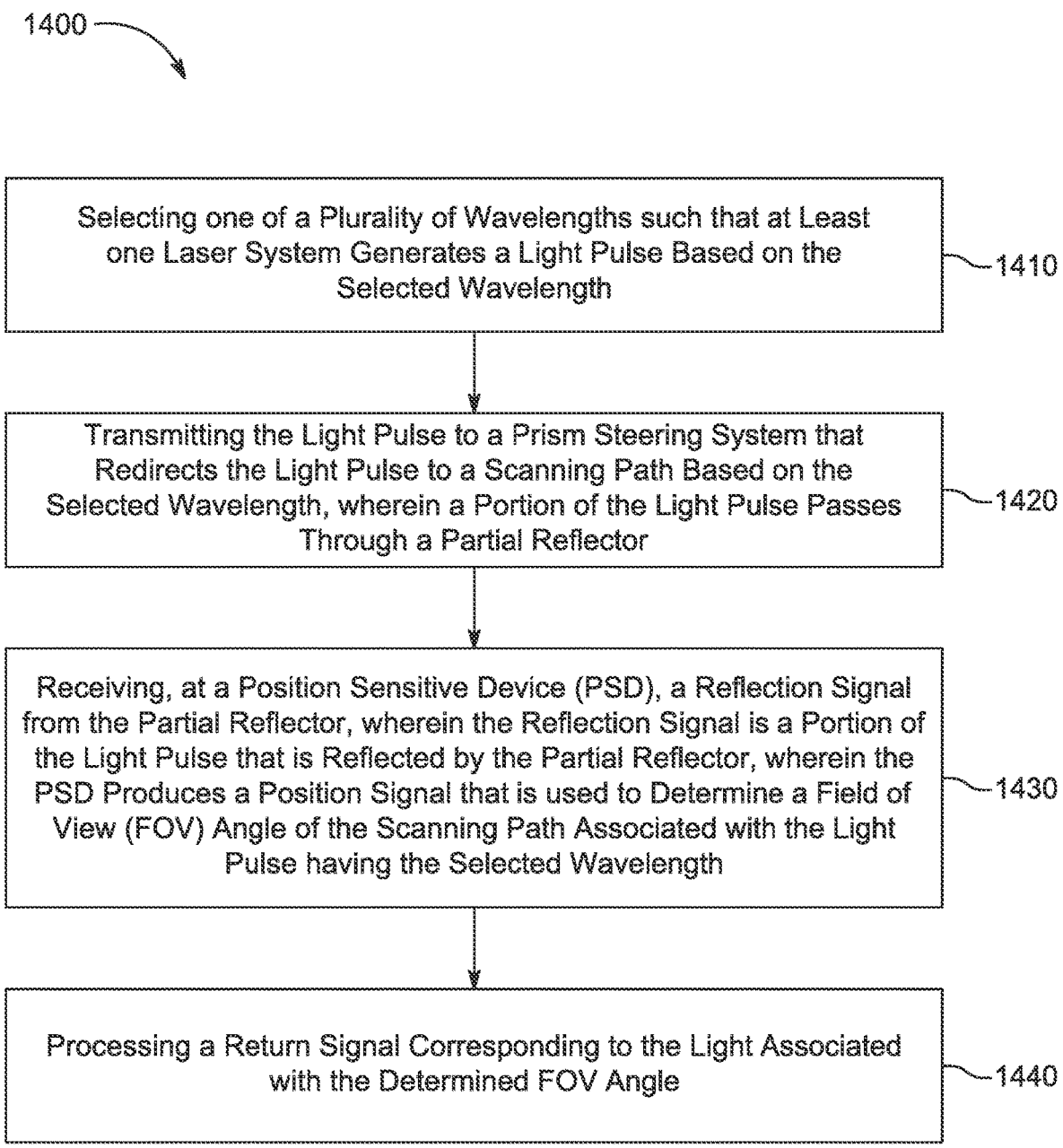
FIG. 14 shows an illustrative process according to an embodiment.

FIG. 14 shows illustrative process 1400 according to an embodiment. Starting at step 1410, one of a plurality of wavelengths is selected such that at least one laser system generates a light pulse based on the selected wavelength. For example, each laser source may sweep through several different wavelengths to output the plurality of light pulses at different wavelengths. At step 1420, the light pulse is transmitted to a prism steering system that redirects the light pulse to a scanning path based on the selected wavelength, wherein a portion of the light pulse passes through a partial reflector. The prism steering system can be, for example, dispersion element 1120 of FIG. 11. At step 1430, a reflection signal from the partial reflector can be received by at a position sensitive device (PSD), wherein the reflection signal is a portion of the light pulse that is reflected by the partial reflector, and wherein the PSD produces a position signal that is used to determine a field of view (FOV) angle of the scanning path associated with the light pulse having the selected wavelength. For example, the PSD may be PSD 1132 and partial reflector may be reflector 1131. At step 1440, a return signal corresponding to the light pulse associated with the determined FOV angle can be processed.

It should be understood that the steps shown in FIG. 14 are merely illustrative and that additional steps may be added, that some steps may be omitted, and that some steps may rearranged.

Figure 15:
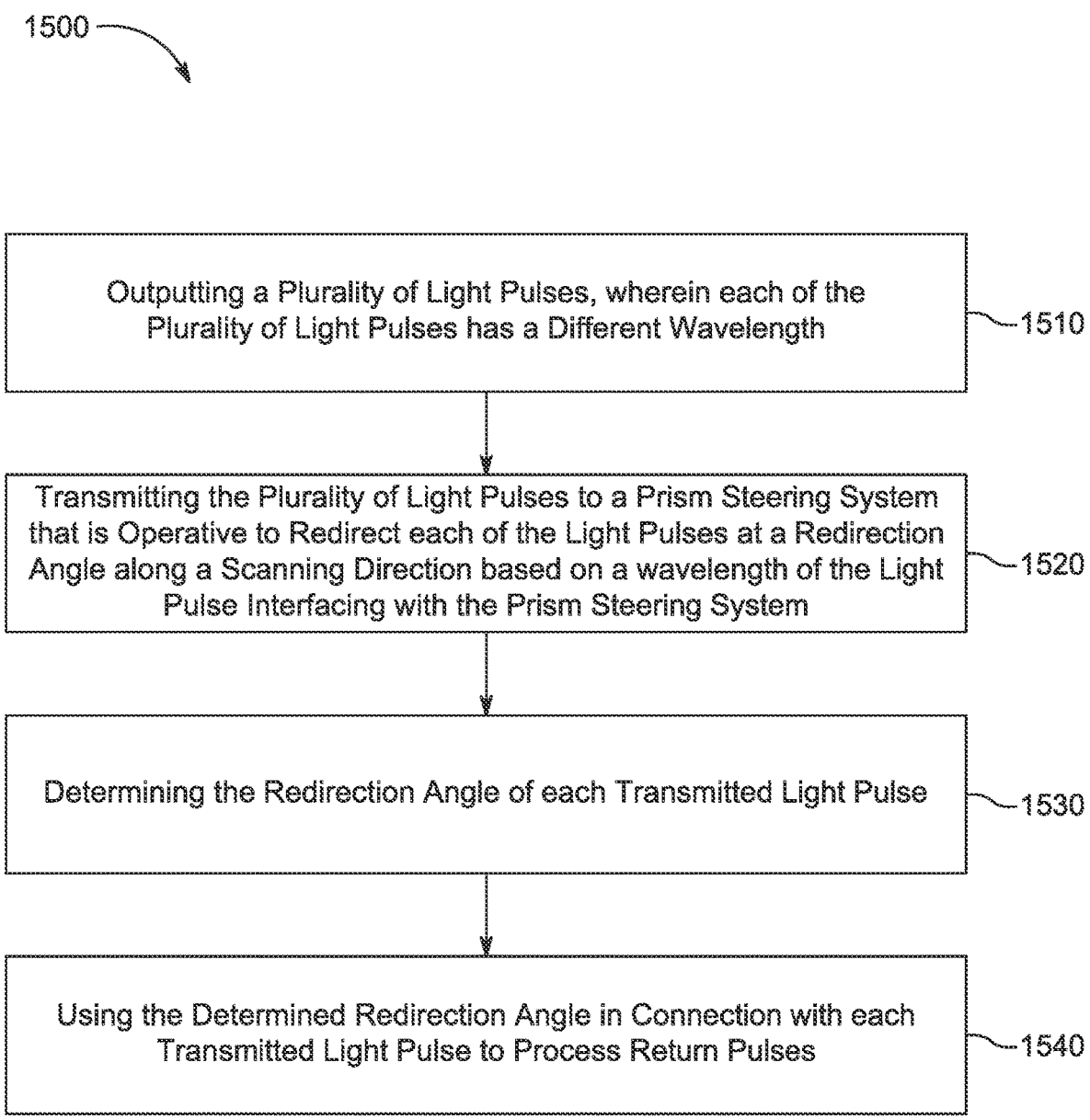
FIG. 15 shows an illustrative process according to an embodiment.

FIG. 15 shows an illustrative process 1500 according to an embodiment. Starting at step 1510, a plurality of light pulses are output, wherein each of the plurality of light pulses has a different wavelength. The plurality of light pulses are transmitted to a prism steering system that is operative to redirect each of the light pulses at a redirection angle along a scanning direction based on a wavelength of the light pulse interfacing with the prism steering system, as shown in step 1520. At step 1530, the redirection angle of each transmitted light pulse is determined, and the determined redirection angle in connection with each transmitted light pulse is used to process return pulses (step 1540).

It should be understood that the steps shown in FIG. 15 are merely illustrative and that additional steps may be added, that some steps may be omitted, and that some steps may rearranged.

Various exemplary embodiments are described herein. Reference is made to these examples in a non-limiting sense. They are provided to illustrate more broadly applicable aspects of the disclosed technology. Various changes may be made and equivalents may be substituted without departing from the true spirit and scope of the various embodiments. In addition, many modifications may be made to adapt a particular situation, material, composition of matter, process, process act(s) or step(s) to the objective(s), spirit or scope of the various embodiments. Further, as will be appreciated by those with skill in the art, each of the individual variations described and illustrated herein has discrete components and features which may be readily separated from or combined with the features of any of the other several embodiments without departing from the scope or spirit of the various embodiments.

The invention claimed is:

1. A light detection and ranging (LiDAR) system comprising:
    one or more light sources configured to provide light comprising at least two light portions having different wavelengths;
    a steering system optically coupled to the one or more light sources to receive the light, wherein the steering system is configured to control scanning of a first direction of a LiDAR field-of-view (FOV), the steering system comprising a wavelength based dispersion element interfacing with the at least two light portions, wherein the wavelength based dispersion element is configured to redirect the at least two light portions at respective redirection angles based on respective wavelengths of the at least two light portions.

2. The system of claim 1, wherein the one or more light sources comprise a wavelength tunable seed laser configured to provide the at least two light portions having different wavelengths.

3. The system of claim 1, wherein the one or more light sources comprise a plurality of laser sources, each laser source of the plurality of laser sources being configured to generate a corresponding light portion of the at least two light portions, and wherein each light portion of the at least two light portions has a different wavelength range.

4. The system of claim 1, wherein the wavelength based dispersion element comprises a prism.

5. The system of claim 1, wherein the wavelength based dispersion element is configured to redirect the at least two light portions at respective redirection angles further based on an incident angle at which the at least two light portions interact with the wavelength based dispersion element.

6. The system of claim 1, wherein the steering system comprising the wavelength based dispersion element is a first steering system, further comprising a second steering system configured to control scanning of a second direction of the LiDAR FOV.

7. The system of claim 6, wherein the second steering system comprises a movable optical scanner.

8. The system of claim 6, wherein the first direction and the second direction are orthogonal.

9. The system of claim 6, wherein the first steering system is configured to receive the light provided by the one or more light sources and direct the light to the second steering system.

10. The system of claim 6, wherein the second steering system comprises another wavelength based dispersion element.

11. The system of claim 1, further comprising an angle detection system configured to determine a redirection angle of each light portion of the at least two light portions redirected by the wavelength based dispersion element.

12. The system of claim 11, further comprising a control system configured to receive the determined redirection angle from the angle detection system and correlate the determined redirection angle with a position of transmission of a corresponding light portion.

13. The system of claim 11, wherein the angle detection system comprises:
   a position sensitive device (PSD); and
   a partial reflector aligned with respect to the wavelength based dispersion element, wherein the partial reflector is configured to direct a part of each redirected light portion to the PSD.

14. The system of claim 13, wherein the partial reflector is further configured to pass another part of each redirected light portion to a second steering system.

15. The system of claim 1, further comprising a fixed position mirror configured to pass the light provided by the one or more light sources to the wavelength based dispersion element.

16. The system of claim 1, wherein a combination of the one or more light sources and the steering system is rotatable.

17. The system of claim 16, a rotational axis of the combination of the one or more light sources and the steering system is aligned with an incident angle of the light provided by the one or more light sources to the steering system.

18. The system of claim 1, further comprising a detector system configured to receive return light directed by the steering system.

* * * * *